United States Patent [19]
Hosoi et al.

[11] Patent Number: 5,298,300
[45] Date of Patent: Mar. 29, 1994

[54] HEAT-SHRINKABLE TUBING AND PROCESS FOR PRODUCING THE SAME

[75] Inventors: Norihiro Hosoi; Tomoyoshi Kishimoto, both of Osaka, Japan

[73] Assignee: Sumitomo Electric Industries, Ltd., Osaka, Japan

[21] Appl. No.: 815,186

[22] Filed: Dec. 31, 1991

[30] Foreign Application Priority Data

Jan. 9, 1991 [JP] Japan .................................. 3-011651

[51] Int. Cl.$^5$ .............................................. B32B 7/02
[52] U.S. Cl. .................................. 428/34.9; 428/35.2; 428/212; 428/421; 428/422; 174/DIG. 8
[58] Field of Search ................ 428/36.9, 36.91, 36.8, 428/34.9, 421, 422, 35.2, 212; 174/DIG. 8; 156/86, 198, 294; 264/DIG. 71, 342 R

[56] References Cited

U.S. PATENT DOCUMENTS

| | | | |
|---|---|---|---|
| 3,861,972 | 1/1975 | Glover et al. | 156/86 |
| 4,634,615 | 1/1987 | Versteegh et al. | 428/34.9 |
| 4,693,940 | 9/1987 | Vogdes et al. | 156/85 |
| 5,059,480 | 10/1991 | Guerra et al. | 428/34.9 |
| 5,143,761 | 9/1992 | Chiotis et al. | 428/34.9 |

FOREIGN PATENT DOCUMENTS

| | | |
|---|---|---|
| 0063913 | 11/1982 | European Pat. Off. |
| 1250503 | 10/1971 | United Kingdom |
| 1440524 | 6/1976 | United Kingdom |
| 2046032 | 11/1980 | United Kingdom |

OTHER PUBLICATIONS

World Patents Index (latest), Accession No. 90-110327, Week 15, Derwent Publications Ltd., London, Great Britain & JP-A-2059325 (Sumitomo), Feb. 28, 1990 Abstract.

World Patents Index (latest), Accession No. 86-073886, Week 11, Derwent Publications Ltd., London, Great Britain & JP-A-61025822 (Sumitomo), Feb. 4, 1986 Abstract.

World Patents Index (latest), Accession No. 90-285967, Week 38, Derwent Publications Ltd., London, Great Britain & JP-A-2200434 (Sumitomo), Aug. 8, 1990 Abstract.

*Primary Examiner*—Ellis P. Robinson
*Assistant Examiner*—Rena L. Dye
*Attorney, Agent, or Firm*—Sughrue, Mion, Zinn, Macpeak & Seas

[57] ABSTRACT

Heat-shrinkable two-layer tubing comprising (a) an outer layer comprising a crosslinked resin composition comprising a fluorine-containing resin containing a vinylidene fluoride unit as a base polymer and a polyfunctional monomer containing at least two unsaturated double bonds in the molecule thereof, and (b) an inner layer having provided on the inner wall of the outer layer comprising a fluorine-containing resin composition. The tubing is excellent in heat resistance and chemical resistance and exerts an excellent sealing effect on heating.

6 Claims, 1 Drawing Sheet

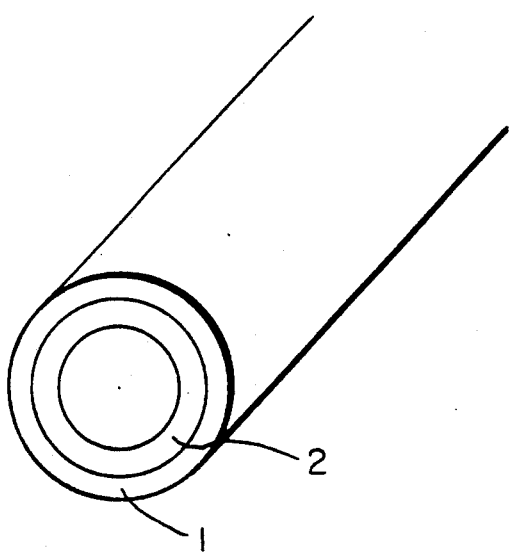

HEAT-SHRINKABLE TUBING AND PROCESS FOR PRODUCING THE SAME

FIELD OF THE INVENTION

The present invention relates to heat-shrinkable two-layer tubing comprising fluorine-containing resins.

BACKGROUND OF THE INVENTION

A resin composition comprising a fluorine-containing resin containing a vinylidene fluoride unit and a polyfunctional monomer is known to undergo electron radiation crosslinking to provide heat-shrinkable tubing as described, e.g., in JP-B-43-29665 (the term "JP-B" as used herein means an "examined published Japanese patent application").

It is also known to provide a hot-melt adhesive layer on the inner wall of heat-shrinkable tubing, which is melted by heating simultaneously with heat shrinkage of the tubing to thereby fill the gap between an adherend surface and the tubing and, at the same time, hold the tubing in place. Many products utilizing such a two-layer structure have been placed in the market.

Examples of hot-melt adhesives generally used as the inner layer of conventional two-layer heat-shrinkable tubing include polyolefin resins, polyamide resins, polyester resins, butyl rubbers, etc. However, these materials are poor in chemical resistance and heat resistance. Further, the inner layer comprising such an adhesive acts to reduce flame retardance of the tubing as a whole. Addition of a flame retardant to the hot-melt adhesive to restore flame retardance leads to reductions in physical properties as an adhesive.

The conventional adhesives have poor chemical resistance and undergo degradation or denaturation in an acidic or alkaline atmosphere, unavoidably resulting in a reduction of sealing effect. Furthermore, the conventional adhesives have poor heat resistance and easily suffer foaming or loss of softness and eventually fall off upon being heated in temperatures higher than necessary or when used for a long time even at temperatures below the melting point.

SUMMARY OF THE INVENTION

An object of the present invention is to provide heat-shrinkable two-layer tubing which is excellent in heat resistance and chemical resistance and exerts an excellent sealing effect on heating.

Another object of the present invention is to provide a process for producing the above-described heat-shrinkable two-layer tubing.

Other objects and effects of the present invention will be apparent from the following description.

As a result of extensive investigations, the present inventors have found that the above objects of the present invention are accomplished by two-layer tubing composed of a crosslinked heat-shrinkable outer layer comprising a fluorine-containing resin containing a vinylidene fluoride unit and an inner layer comprising a fluorine-containing resin composition.

The present invention provides heat-shrinkable two-layer tubing comprising (a) an outer layer comprising a crosslinked resin composition comprising a fluorine-containing resin containing a vinylidene fluoride unit as a base polymer and a polyfunctional monomer containing at least two unsaturated double bonds in the molecule thereof, and (b) an inner layer having provided on the inner wall of the outer layer comprising a fluorine-containing resin composition.

The fluorine-containing resin composition constituting the inner layer preferably has a melting point of not higher than 110° C. as measured by means of a differential scanning calorimeter (DSC) with a rise in temperature and a melt index (MI) of not less than 10.

The melt index used herein is measured under the conditions according to JIS K6760 at 150° C. and 2.16 kg unless otherwise specified.

The present invention also provides a process for producing the above-described heat-shrinkable two-layer tubing, which comprises the steps of: (1) extruding each of (a) a fluorine-containing resin composition comprising a fluorine-containing resin containing a vinylidene fluoride unit as a base polymer and a polyfunctional monomer containing at least two unsaturated double bonds in the molecule thereof and (b) a fluorine-containing resin composition to form two-layer tubing with the fluorine-containing resin composition (a) as an outer layer and the fluorine-containing resin composition (b) as an inner layer, (2) irradiating the resulting two-layer tubing with ionizing radiation to cause only the outer layer to crosslink, and (3) inflating the tubing in the radial direction thereof while heating to endow the tubing with heat-shrinkability.

BRIEF DESCRIPTION OF THE DRAWING

FIG. 1 illustrates the appearance of one embodiment of the two-layer heat-shrinkable tubing according to the present invention.

DETAILED DESCRIPTION OF THE INVENTION

In FIG. 1 illustrating one embodiment according to the present invention, the numeral 1 denotes an outer layer comprising a crosslinked fluorine-resin composition, and the numeral 2 denotes an inner layer (hot-melt adhesive layer) comprising a substantially non-crosslinked fluorine resin composition having a low melting point and a high fluidity.

Examples of the fluorine-containing resin containing a vinylidene fluoride unit which can be used as a base polymer constituting the outer layer of the heat-shrinkable tubing includes a vinylidene fluoride homopolymer (preferably having an elongation of from 50 to 500%, a tensile strength of 1 to 5 kg/mm$^2$ and an MI at 230° C. of 0.01 to 0.1 g/10 min.), a vinylidene fluoride/hexafluoropropylene copolymer (preferably having an elongation of from 200 to 800%, a tensile strength of 3 to 5 kg/mm$^2$ and an MI at 230° C. of 1 to 6 g/10 min.), and a vinylidene fluoride/hexafluoropropylene/tetrafluoroethylene terpolymer (preferably having an elongation of from 300 to 1,000%, a tensile strength of 0.4 to 5 kg/mm$^2$ and an MI at 230° C. of 0.1 to 500 g/10 min.). For obtaining tubing with satisfactory physical properties, a vinylidene fluoride/hexafluoropropylene/tetrafluoroethylene terpolymer is preferred.

The fluorine-containing resin composition constituting the heat-shrinkable tubing outer layer may contain, in addition to the vinylidene fluoride-containing resin, other optional thermoplastic resins, such as polyolefin resins, unless the functions as heat-shrinkable tubing are impaired. Examples of the optional thermoplastic resin include very low density polyethylene (VLDPE) and ethylene/vinyl acetate copolymers (EVA). The amount of the optional thermoplastic resin is generally from 5 to 60 parts by weight per 100 parts by weight of the fluorine-containing resin.

Examples of the polyfunctional monomers containing unsaturated double bonds which serve as a crosslinking agent in the fluorine-containing resin composition constituting the outer layer of the heat-shrinkable tubing include triallyl cyanurate, triallyl isocyanurate, trimethylolpropane trimethacrylate, trimethylolethane methacrylate, trimethylol-propane acrylate, trimethylolpropane triacrylate, trimethylolethane triacrylate, trimethylolpropane methacrylate, and tetramethylolmethane tetraacrylate. Preferred of them are trimethylolpropane acrylate, triallyl isocyanurate, triallyl cyanurate, trimethylolethane methacrylate and trimethylolpropane methacrylate from the standpoint of crosslinking properties, heat resistance, and dispersibility in the resin composition.

The amount of the polyfunctional monomer to be added is not particularly limited and generally ranges from 0.1 to 20 parts by weight, and preferably from 0.5 to 5 parts by weight, per 100 parts by weight of the fluorine-containing resin composition.

The fluorine-containing resin composition which can be used as the inner layer preferably have a low melting point and high fluidity for manifestation of hot-melt properties. To this effect, it is preferred to use, among many fluorine-containing resins, those containing vinylidene fluoride as a repeating unit. The most suitable is a vinylidene fluoride/hexafluoropropylene/tetrafluoroethylene terpolymer preferably having a weight ratio of the repeating units of (60 to 80)/(5 to 1)/(15 to 25), more preferably (70 to 73)/(9 to 12)/(18 to 23), with the total being 100.

It is preferable that the fluorine-containing resin constituting the inner layer, particularly a vinylidene fluoride copolymer, has a melting peak corresponding to a melting point of up to 110° C., and preferably from 90° to 100° C., as observed in differential thermal analysis with a rise in temperature by means of DSC because it is completely melted in temperatures of from 110° to 130° C.

It is also preferable that the fluorine-containing resin composition constituting the inner layer has an MI of 10 or more, more preferably 30 or more, because such a resin composition is ready to be filled in the gap between the tubing and an adherend upon being heated and, at the same time, to prevent invasion of air or any chemicals therebetween.

If the copolymerization ratio of the above-described vinylidene fluoride terpolymer for use as an inner layer is out of the recited preferred range, the terpolymer may have a melting point as high as about 140° to about 200° C. or an MI of less than 10. When such a resin is used as an inner layer of heat-shrinkable tubing particularly for sealing an adherend having an uneven surface, the resin sometimes cannot completely fill the gap, failing to achieve tight sealing.

If in using a general vinylidene fluoride copolymer resin having a melting point between 140° and 200° C. which is approximate to that of the fluorine-containing resin composition of the outer layer, such a resin tends to fail to be sufficiently melted because the temperature rise in the inner layer is milder than that in the outer layer due to heat conduction to an adherend in contact with the inner layer.

In addition, where tubing having such an inner layer needing exposure to high temperatures is applied to an adherend comprising an ethylene/vinyl acetate copolymer (EVA), etc. as a base polymer, the exposure to high temperatures is liable to cause release of acetic acid from the adherend resulting in foaming or thermal deterioration thereof.

If desired, the fluorine-containing resin compositions for the outer and inner layers may contain conventional additives, such as antioxidants, fillers, lubricants, coloring agents, and stabilizers.

In the production process, if the inner layer is concurrently crosslinked by ionized radiation to cause appreciable reduction of fluidity, a crosslinking inhibitor, e.g., Sumilizer BHT (a trade-name of 2,6-di-tert-butyl-4-methylphenol produced by Sumitomo Chemical Co., Ltd.), may be added to the inner layer.

The heat-shrinkable two-layer tubing of the present invention can be produced, for example, by the following process. (1) Fluorine-containing resin compositions for an outer layer and an inner layer are co-extruded to obtain laminated tubing. Alternatively, tubing for the outer layer is followed by tubing for the inner layer. In the latter case, an adhesive or an anchoring agent may be coated on the inner wall of the outer layer before tubing of the inner layer. (2) The resulting two-layer tubing is irradiated with ionized radiation, e.g., electron rays, at an absorbed dose, for example, of from 5 to 30 Mrad to crosslink only the outer layer containing the polyfunctional monomer (crosslinking agent). The intensity and the absorbed dose of the ionized radiation can be appropriately determined so that only the outer layer is crosslinked but the inner layer suffers substantially no crosslinking. (3) The two-layer tubing having the thus crosslinked outer layer is then deformed under heating, for example, inflated in the radial direction or stretched, followed by cold setting to obtain tubing having heat shrinkability. The ratio of deformation, e.g., the inflating ratio and the stretching ratio, is preferably from 1.1 to 5 times, and more preferably from 1.5 to 3 times.

The thickness of the outer layer is preferably from 0.1 to 3 mm, more preferably from 0.1 to 1 mm before inflation, and is preferably from 0.05 to 0.5 mm after inflation. The thickness of the inner layer is preferably from 0.01 to 2 mm, more preferably from 0.05 to 0.5 mm before inflation, and is preferably from 0.001 to 0.1 mm, more preferably from 0.01 to 0.1 mm after inflation. The ratio of the thickness of the outer layer to that of the inner layer (outer/inner) is preferably from 9/1 to 4/6.

The dimensions of the heat-shrinkable tubing of the present invention is not limited but the outer diameter is generally about from 0.5 mm to 30 cm, particularly from 1 to 5 cm, and the inner diameter is generally about from 0.01 mm to 20 cm, particularly from 0.1 to 4.9 cm.

Since the fluorine-containing resin composition constituting the outer layer contains a resin having a vinylidene fluoride unit as a base polymer and also a polyfunctional monomer (crosslinking agent), the outer layer undergoes crosslinking on irradiation of ionized radiation to provide heat-shrinkable tubing excellent in heat resistance and chemical resistance.

Further, since the fluorine-containing resin composition preferably constituting the inner layer is a hot-melt type resin containing a vinylidene fluoride unit and having a low melting point and a high fluidity, i.e., a DSC melting point of not higher than 110° C. and an MI of not less than 10, particularly a vinylidene fluoride/hexafluoropropylene/tetrafluoroethylene terpolymer, it is completely melted at the time of heat shrinkage so that the gap between tubing and an adherend may be tightly filled therewith without being accompanied with invasion of air or any chemicals. Thus, there is provided heat-shrinkable tubing having high sealing performance.

Namely, since the outer and inner layers both comprising specific fluorine-containing resins, the tubing is excellent in heat resistance and chemical resistance and produces high sealing effects for an adherend upon being heated.

The present invention is now illustrated in greater detail with reference to Examples, but it should be understood that the present invention is not deemed to be limited thereto. All the parts, percents, and ratios are by weight unless otherwise indicated.

EXAMPLE 1

A composition for an outer layer composed of 100 parts of a vinylidene fluoride/hexafluoropropylene/tetrafluoroethylene terpolymer (polymerization ratio: 70/10/20) and 1 part of trimethylolpropane trimethacrylate, and a vinylidene fluoride/hexafluoropropylene/tetrafluoroethylene terpolymer for an outer layer (polymerization ratio: 70/10/20; DSC melting point: 93° C.; MI: 18) were co-extruded at 130° C. to obtain two-layer tubing.

The tubing was irradiated with electron rays at 20 Mrad accelerated to 1 Mev and then inflated twice the original diameter at 150° C. to obtain a two-layer heat-shrinkable tubing. The inflated tubing had an outer layer thickness of 0.3 mm and an inner layer thickness of 0.1 mm.

A wire extrusion-coated with Viton B 50 (a trade name of a vinylidene fluoride/tetrafluoroethylene/hexafluoropropylene fluoro elastomer produced by E.I. Du Pont) was fit through the resulting heat-shrinkable tubing and heated at 140° C. for 5 minutes. The wire-containing tubing was immersed in each of 10% hydrochloric acid, 10% sulfuric acid, and 50% formic acid at 80° C. for 1 week. After taking out of the immersion bath, the tubing was cut open to examine penetration of the acidic solution. As a result, no penetration was observed.

EXAMPLE 2

Two-layer tubing was produced in the same manner as in Example 1, except that the vinylidene fluoride/hexafluoropropylene/ tetrafluoroethylene terpolymer for the outer layer was replaced with a vinylidene fluoride/tetrafluoroethylene copolymer (polymerization ratio: 80/20) and a vinylidene fluoride/hexafluoropropylene/tetrafluoroethylene terpolymer (polymerization ratio: 60/15/25; DSC melting point: 95° C.; MI: 25) was used as an inner layer.

The tubing was irradiated with electron rays at 20 Mrad accelerated to 1 Mev and then inflated 1.5 times the original diameter at 160° C. to obtain a heat-shrinkable two-layer tubing.

The resulting tubing was immersed in water at 25° C. for 1 day. After thoroughly wiping water drops from the outer and inner walls of the tubing, the tubing was heated at 180° C. for 30 minutes. As a result, no abnormality such as foaming occurred.

EXAMPLE 3

The heat-shrinkable two-layer tubing obtained in Example 1 was put on the splice joint of polyethylene-coated wires, one having an outer diameter of 3 mm, and the other having an outer diameter of 5 mm, followed by heating to shrink.

The tubing containing the splice joint was horizontally immersed in a 5% sodium chloride aqueous solution for 1 day. A direct current of 50 V was applied between the wires and the immersion bath. The leakage current was found to be 0.01 μA or less.

COMPARATIVE EXAMPLE 1

Two-layer tubing was produced in the same manner as in Example 1, except for using a polyamide type hot-melt adhesive ("DPX 1301" produced by Henkel Hakusui K. K.) as an inner layer.

A wire extrusion-coated with Viton B 50 was fit through the heat-shrinkable tubing and heated at 140° C. for 5 minutes. The wire-containing tubing was immersed in each of 10% hydrochloric acid, 10% sulfuric acid, and 50% formic acid at 80° C. for 1 week. After taking out of the immersion bath, the tubing was cut open to examine penetration of the acidic solution. It was found that the inner layer suffered from erosion with formic acid most seriously, and penetration deep into the inside of the tubing was observed.

Further, the tubing was immersed in water at 25° C. for 1 day. After thoroughly wiping water drops from the outer and inner walls of the tubing, the tubing was heated at 180° C. for 30 minutes. As a result, the inner layer developed foams, and the tubing was of no use.

EXAMPLE 4

Two-layer tubing was produced in the same manner as in Example 1, except for using a resin composition comprising 80 parts of a vinylidene fluoride/hexafluoropropylene/tetrafluoroethylene (polymerization ratio: 50/30/20), 20 parts of EVA (vinyl acetate content: 20%), and 1 part of trimethylolpropane triacrylate as an inner layer. The tubing was irradiated and then inflated by heating in the same manner as in Example 1.

The resulting heat-shrinkable tubing was put on a wire having linear low-density polyethylene (LLDPE) as an insulating coating and heated at 140° C. for 5 minutes. After the tubing containing the wire was immersed in water at 80° C. for 1 week, penetration of water into the inside of the tubing was slightly observed.

EXAMPLE 5

The heat-shrinkable two-layer tubing obtained in Example 4 was put on the splice joint of polyethylene-coated wires, one having an outer diameter of 3 mm, and the other having an outer diameter of 5 mm, followed heating to shrink.

The tubing containing the splice joint was horizontally immersed in a 5% sodium chloride aqueous solution for 1 day. A direct current of 50 V was applied between the wires and the immersion bath. The leakage current was found to be 1.2 μA As described and demonstrated above, the two-layer tubing according to the present invention exhibits satisfactory adhesion to not only adherends comprising fluorine-containing resin but those comprising olefin resins, e.g., EVA, to produce sufficient sealing effects. Even if the tubing of the present invention is stored before use under seriously bad conditions, e.g., at high humidity, it absorbs substantially non moisture and, therefore, entails no fear of unfavorable phenomena such as foaming on heating. Further, the tubing maintains its chemical resistance and flame retardance even after heat shrinkage, it is particularly beneficial when applied to those parts requiring environmental resistance.

While the invention has been described in detail and with reference to specific examples thereof, it will be apparent to one skilled in the art that various changes and modifications can be made therein without departing from the spirit and scope thereof.

What is claimed is:

1. Heat-shrinkable two-layer tubing comprising:
   (a) an outer layer comprising a crosslinked fluorine-containing resin composition comprising a fluorine-containing resin containing a vinylidene fluoride unit as a base polymer and a polyfunctional monomer containing at least two unsaturated double bonds in the molecule thereof, and
   (b) an inner layer provided on the inner wall of said outer layer consisting essentially of a fluorine-containing resin composition which (1) has a melting point of not higher than 110° C. as measured by means of a differential scanning calorimeter with a rise in temperature, (2) has a fluorine-containing resin containing a vinylidene fluoride unit, and (3) is non-crosslinked.

2. Heat-shrinkable two-layer tubing as claimed in claim 1, wherein said fluorine-containing resin containing a vinylidene fluoride unit is a vinylidene fluoride/hexafluoropropylene/ tetrafluoroethylene terpolymer.

3. Heat-shrinkable two-layer tubing as claimed in claim 1, wherein said polyfunctional monomer is trimethylolpropane acrylate, triallyl isocyanurate, triallyl cyanurate, trimethylolethane methacrylate, or trimethylolpropane methacrylate.

4. Heat-shrinkable two-layer tubing as claimed in claim 1, wherein said polyfunctional monomer is present in a proportion of from 0.1 to 20 parts by weight per 100 parts by weight of said fluorine-containing resin composition.

5. Heat-shrinkable two-layer tubing as claimed in claim 1, wherein said fluorine-containing resin composition constituting the inner layer has a melt index of not less than 10.

6. Heat-shrinkable two-layer tubing as claimed in claim 1, wherein said fluorine-containing resin composition constituting the inner layer is a vinylidene fluoride/hexafluoropropylene/ tetrafluoroethylene terpolymer having a weight ratio of the repeating units of 60 to 80/5 to 15/15 to 25 with the total being 100.

* * * * *